Jan. 7, 1969   L. CAUDELL ETAL   3,420,348
STORAGE RACK RAIL MEMBER
Filed Feb. 13, 1967
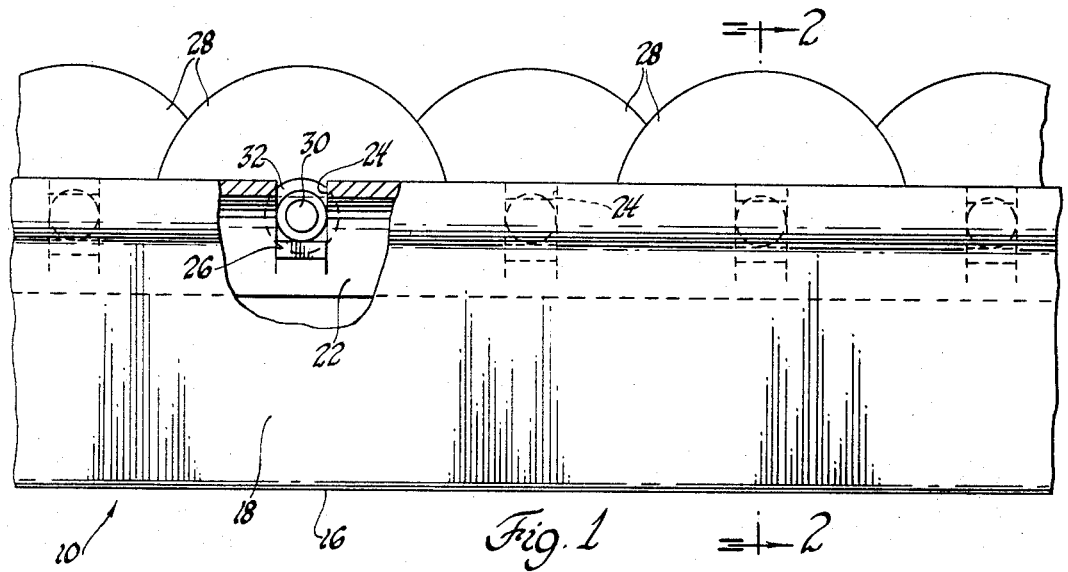
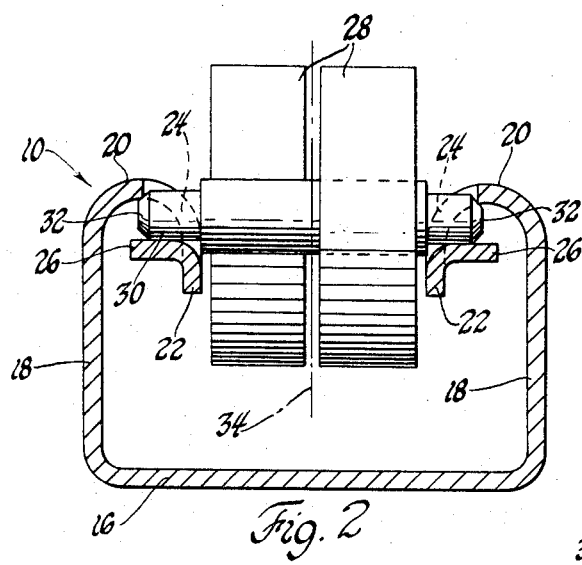
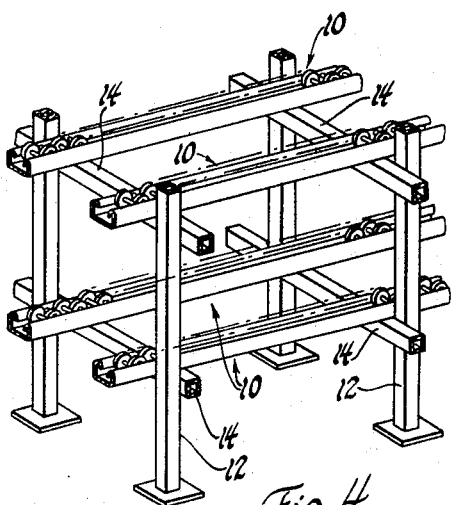
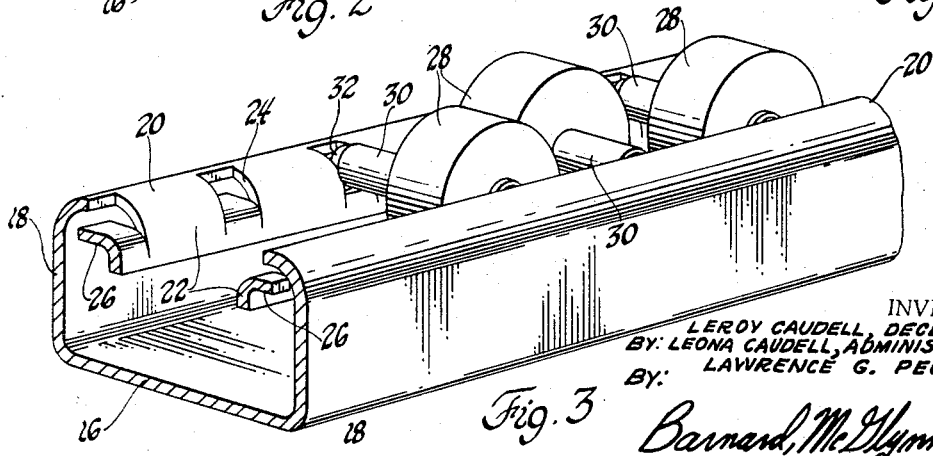
INVENTORS
LEROY CAUDELL, DECEASED
BY: LEONA CAUDELL, ADMINISTRATRIX
LAWRENCE G. PECK
BY: Barnard, McGlynn & Reising
ATTORNEYS

United States Patent Office 3,420,348
Patented Jan. 7, 1969

3,420,348
STORAGE RACK RAIL MEMBER
Leroy Caudell, deceased, late of Farmington, Mich., by Leona Caudell, administratrix, Farmington, Mich., and Lawrence G. Peck, Livonia, Mich., assignors, by mesne assignments, to Storage Systems, Inc., Detroit, Mich., a corporation of Michigan
Filed Feb. 13, 1967, Ser. No. 616,443
U.S. Cl. 193—35                5 Claims
Int. Cl. B65g 13/00

This invention relates to storage racks of the type upon which pallets or other articles are deposited for storage and, more specifically, to a storage rack utilizing rail members with rollers disposed along each rail member in offset and overlapping relationship for supporting and facilitating movement of pallets or other articles along the rail members.

Storage racks of the type to which the instant invention pertains are utilized in warehouses or other facilities for supporting pallets and other articles which are frequently moved about by a fork lift truck. Examples of such storage racks are illustrated and claimed in U.S. Patents 3,337,061 and 3,365,073 assigned to the assignee of the instant application. Frequently, a fork lift truck is utilized to carry a loaded pallet to the storage rack where the pallet is deposited on the rack for storage. It is often necessary that the pallets or other articles placed on the storage racks be moved along the storage racks without the utilization of a fork lift truck or other such means.

Accordingly, it is an object and feature of this invention to provide a patentably novel rail member including roller elements disposed therealong for supporting and facilitating the movement of articles stored in such storage racks.

Another object and feature of this invention is to provide a rail member of the type utilized in storage racks and including a plurality of rollers disposed along the rail member in offset and overlapping relationship to provide a substantially continuous rolling surface and reducing the necessary load carrying capacity of each individual roller.

In general, these and other objects and features of this invention may be attained in a storage rack utilizing a preferred embodiment of the rail member of the instant invention which includes a plurality of rollers disposed therealong in offset and overlapping relationship. More specifically, each rail has a cross section including a base portion with a pair of spaced parallel legs extending substantially coextensively from the base portion with the extremities of the legs formed into return portions to provide spaced flanges disposed between the legs. There are a plurality of holes disposed along the beam in the respective flanges and each of the rollers is rotatably supported on an axle with the ends of each axle disposed in a pair of holes in the respective flanges. Adjacent rollers along the rail member are alternately disposed on opposite sides of a plane parallel to and halfway between the legs of the rail member. In addition, each roller is disposed in overlapping relationship with the two adjacent rollers longitudinally along the rail member.

Other objects and attendant advantages of this invention will be readily appreciated as the same becomes better understood by reference to the following detailed description when considered in connection with the accompanying drawings wherein:

FIGURE 1 is a fragentary side elevational view of a preferred embodiment of the instant invention;

FIGURE 2 is a cross-sectional view taken substantially along line line 2–2 of FIGURE 1;

FIGURE 3 is a perspective view of the embodiment illustrated in FIGURES 1 and 2; and FIGURE 4 is a perspective view of a storage rack utilizing the rail member of the instant invention.

Referring now to the drawings, wherein like numerals indicate like or corresponding parts throughout the several views, a preferred embodiment of the rail member of the instant invention is generally shown at 10.

A typical storage rack is illustrated in FIGURE 4 and includes the upright members 12, the cross members 14 and the rail members 10. Normally, a pallet or other articles are placed upon and supported by two adjacent rail members 10 between the uprights 12.

Referring more specifically to FIGURES 1 through 3, the rail member of the instant invention has a cross section including a base portion 16 and a pair of spaced parallel legs 18 which extend substantially coextensively from the base portion 16. The extremities of the legs 18 are formed into return portions 20 to provide spaced flanges 22. The flanges 22 are parallel to one another and are disposed between the legs 18. The flanges 22 have a plurality of holes 24 spaced along the rail member 10. A tab 26 extends from the lower extremity of each hole 24 and toward the adjacent leg so that the tabs 26 along one flange 22 extend in an opposite direction to the tabs 26 along the other flange 22.

A plurality of rollers 28 are disposed along the rail member 10. Each of the rollers 28 is rotatably supported on an axle 30. Each axle 30 has the ends thereof disposed in a pair of holes 24 in the respective flanges 22 and each end rests upon a tab 26. Each end of each axle 30 is conically tapered at 32 with the upper extremity of each hole 24 (i.e. the extremity which is opposite to the tabs 26) being in engagement with the conically tapered portion 32 for retaining the respective rollers 28 in position. That is to say, each roller 28 may be snapped into position and held there because of the coaction between the conically tapered portions 32 and the upper extremities of the holes 24. It will be understood, of course, that the ends of the axles 30 need not be tapered to practice the invention since a non-tapered axle end may be disposed in and retained by the return portions 20.

The rollers 28 are disposed along the rail member 10 in offset and overlapping relationship. That is to say, adjacent rollers 28 along the rail member 10 are alternatively disposed on opposite sides of the plane 34, which is parallel to and halfway between the legs 18, for rotation about respective axes which are perpendicular to the plane 34, and, in addition, are disposed in overlapping relationship from one roller to the adjacent roller longitudinally along the rail member 10. As best illustrated in FIGURE 1, adjacent rollers may overlap one another to the extent that the periphery of each roller is disposed in very close relationship to the axle of the next adjacent roller whereby a substantially continuous rolling surface is provided by the upper peripheries of the adjacent rollers. Thus, the load supported by the rollers is divided among a great number of rollers which in turn reduces the frictional loads on each roller to facilitate movement of the article and to reduce the possibility of the articles being hung up in the gaps between adjacent rollers.

The invention has been described in an illustrative manner and it is to be understood that the terminology which has been used is intended to be in the nature of words of description rather than of limitation.

Obviously, many modifications and variations in the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. An article supporting member having a U-shaped cross section which includes a lower base portion and a pair of upstanding parallel legs extending substantially normal thereto, the extremeties of said legs being formed into return portions extending inwardly toward each other and downwardly toward the base portion to provide spaced flanges disposed between said legs; a plurality of pairs of upwardly facing, transversely aligned holes formed in said return portions, each hole having and upper portion, a lower portion and side portions extending inwardly and downwardly along one of said return portions; the transvcerse spacing between the upper portions of each pair of holes exceeding the transverse spacing between the lower portions thereof; a plurality of roller elements each including an axle having an end-to-end dimension slightly in excess of the transverse spacing between the upper portions of a pair of holes whereby a roller element may be pressed into engagement with a pair of holes and retained therein by an overlapping relation between the upper portions of said pair of holes and the ends of the roller element axle.

2. An article supporting member as set forth in claim 1 wherein each hole includes a tab struck from the return portion in which such hole is formed and extending toward the upstanding leg adjacent thereto, each tab forming a support for a roller element axle.

3. An article supporting member as set forth in claim 1 wherein each axle end is provided with a tapered portion overlapped by the upper portion of the hole in which such axle end is engaged.

4. A rail member of the type utilized in storage racks, said rail member having a cross section including a base portion, a pair of spaced parallel legs extending substantially coextensively from said base portion, the extermities of said legs being formed into return portions to provide spaced flanges disposed between said legs, said flanges having a plurality of holes spaced therealong, a tab extending from one extremity of each hole toward the adjacent leg so that the tabs along one flange extend in an opposite direction to the tabs along the other flange, and a plurality of rollers disposed along said rail member, each of said rollers being rotatably supported on an axle, each axle having the ends thereof disposed in a pair of holes in said flanges and resting on the tabs extending from said pair of holes, adjacent rollers along said rail member being alternately disposed on opposite sides of a plane for rotation about respective axes which are perpendicular to said plane, said plane being parallel to and halfway between said legs, said rollers being disposed in overlapping relationship from one roller to the adjacent roller longitudinally along said rail member.

5. A rail member of the type set forth in claim 4 wherein each end of said axles is conically tapered with the extremity of each hole which is opposite to said tabs being in engagement therewith whereby each of said rollers is retained in position.

References Cited

UNITED STATES PATENTS

| | | | |
|---|---|---|---|
| 799,699 | 9/1905 | Winter | 193—35 |
| 872,856 | 12/1907 | Spence | 193—37 X |
| 2,825,439 | 3/1958 | Collis | 193—35 |
| 2,827,153 | 3/1958 | Olk et al. | 193—35 X |
| 2,964,154 | 12/1960 | Erickson | 193—35 |
| 3,144,111 | 8/1964 | Anderson | 193—35 |

EVON C. BLUNK, *Primary Examiner.*

M. L. AJEMAN, *Assistant Examiner.*